120,206

UNITED STATES PATENT OFFICE.

JOHN McCALLUM AND JACOB HARTZELL, OF ALLIANCE, OHIO.

IMPROVEMENT IN FIRE-LIGHTERS.

Specification forming part of Letters Patent No. 120,206, dated October 24, 1871.

*To all whom it may concern:*

Be it known that we, JOHN McCALLUM and JACOB HARTZELL, of Alliance, in the county of Stark and State of Ohio, have invented an Improved Fire-Lighter; and we do hereby declare the following to be a full and correct description of the same.

The object of our invention is the production of a fire-lighter, which will stand frequent lighting without disintegration.

We make our fire-lighter of the following ingredients, in the proportions named: Fire-clay, eight pounds; hard-wood ashes, three-quarters pound; charcoal, three-quarters pound; sand, half pound; resin, quarter pound; silicic acid, two ounces. These ingredients are made into a ball, and baked till hard, a wire being inserted to serve as a handle.

We do not claim, broadly, a fire-kindler formed of a bulb of clay having a wire handle, as patented by H. K. Horton, February 9, 1869; but

What we claim, and desire to secure by Letters Patent, is—

The fire-lighter, hereinbefore described, made of the ingredients combined in the proportions specified.

The above specification of our said invention signed and witnessed at Alliance, Ohio, this 12th day of September, A. D. 1871.

JOHN McCALLUM.
JACOB HARTZELL.

Witnesses:
J. J. PARKER,
J. B. ENGLISH.

(61)